US012689574B2

(12) United States Patent
Levi et al.

(10) Patent No.: US 12,689,574 B2
(45) Date of Patent: Jul. 21, 2026

(54) SYNCHRONIZED RATE CONTROL AT RATE LIMITER

(71) Applicant: Mellanox Technologies, Ltd., Yokneam Illit (IL)

(72) Inventors: Dotan David Levi, Kiryat Motzkin (IL); Liron Mula, Hertzlia (IL); Natan Manevich, Nesher (IL)

(73) Assignee: Mellanox Technologies, Ltd., Yokneam Illit (IL)

( * ) Notice: Subject to any disclaimer, the term of this patent is extended or adjusted under 35 U.S.C. 154(b) by 649 days.

(21) Appl. No.: 18/107,442

(22) Filed: Feb. 8, 2023

(65) Prior Publication Data

US 2023/0361900 A1 Nov. 9, 2023

Related U.S. Application Data

(60) Provisional application No. 63/339,538, filed on May 9, 2022.

(51) Int. Cl.
| | |
|---|---|
| *H04L 43/0888* | (2022.01) |
| *H04J 3/06* | (2006.01) |
| *H04L 47/22* | (2022.01) |
| *H04L 47/25* | (2022.01) |
| *H04L 47/263* | (2022.01) |

(52) U.S. Cl.
CPC ........ *H04L 43/0888* (2013.01); *H04J 3/0652* (2013.01); *H04J 3/0667* (2013.01); *H04L 47/225* (2013.01); *H04L 47/25* (2013.01); *H04L 47/263* (2013.01)

(58) Field of Classification Search
CPC . H04L 43/0888; H04L 43/20; H04L 43/0894; H04L 47/225; H04L 47/25; H04L 47/263; H04J 3/0652; H04J 3/0667
See application file for complete search history.

(56) References Cited

U.S. PATENT DOCUMENTS

| | | | | |
|---|---|---|---|---|
| 10,511,403 B2 * | 12/2019 | Bush | ..................... | H04L 63/061 |
| 10,581,728 B1 * | 3/2020 | Zipperer | ................. | H04L 45/38 |

(Continued)

FOREIGN PATENT DOCUMENTS

| | | | | |
|---|---|---|---|---|
| DE | 102021130893 A1 * | 6/2022 | ............. | H04L 67/12 |
| EP | 2860890 B1 * | 11/2022 | ......... | G01N 33/0075 |

(Continued)

OTHER PUBLICATIONS

Machine translation of WO 2021253725 A1 (Year: 2021).*

*Primary Examiner* — Sujoy K Kundu
*Assistant Examiner* — Vladislav Y Agureyev
(74) *Attorney, Agent, or Firm* — Lowenstein Sandler LLP

(57) ABSTRACT

A system includes a device coupled to a processing device. The processing device is to receive a timing signal associated with a synchronized time. The processing device is further to synchronize a rate limiter of the device to the synchronized time responsive to receiving the timing signal, wherein the rate limiter is configured to schedule one or more workloads at a respective rate. The processing device is to receive a request to execute the one or more workloads, the request comprising a rate to execute each workload of the one or more workloads. The processing device is to execute the one or more workloads at the respective rate upon synchronizing the rate limiter.

18 Claims, 7 Drawing Sheets

(56)          References Cited

U.S. PATENT DOCUMENTS

| | | | | |
|---|---|---|---|---|
| 2009/0109867 | A1* | 4/2009 | Mangetsu | H04L 43/50 |
| | | | | 370/468 |
| 2010/0220692 | A1* | 9/2010 | Diab | H04J 3/0641 |
| | | | | 370/336 |
| 2013/0142066 | A1* | 6/2013 | Yamaguchi | H04L 49/252 |
| | | | | 370/252 |
| 2016/0170437 | A1* | 6/2016 | Aweya | H04B 10/071 |
| | | | | 713/503 |
| 2016/0286575 | A1* | 9/2016 | Weingertner | G10L 19/167 |
| 2017/0155590 | A1* | 6/2017 | Dillon | H04L 12/2867 |
| 2017/0222905 | A1* | 8/2017 | Leroux | H04L 43/0876 |
| 2018/0007520 | A1* | 1/2018 | Gustafson | H04W 72/23 |
| 2018/0095156 | A1* | 4/2018 | Katz | G01S 19/02 |
| 2018/0109369 | A1* | 4/2018 | Hamour | H04J 3/0641 |
| 2018/0131614 | A1* | 5/2018 | Song | H04L 47/283 |
| 2018/0188698 | A1* | 7/2018 | Dionne | G04R 20/04 |
| 2018/0212885 | A1* | 7/2018 | Contavalli | H04L 47/28 |
| 2018/0212886 | A1* | 7/2018 | Contavalli | H04L 47/225 |
| 2018/0237039 | A1* | 8/2018 | Mong | B61L 23/005 |
| 2018/0246942 | A1* | 8/2018 | Chen | G06F 16/248 |
| 2018/0352525 | A1* | 12/2018 | Li | H04W 56/004 |
| 2019/0018145 | A1* | 1/2019 | Roovers | G01S 19/256 |
| 2019/0158371 | A1* | 5/2019 | Dillon | H04L 47/196 |
| 2019/0173793 | A1* | 6/2019 | Liu | H04L 47/25 |
| 2019/0215729 | A1* | 7/2019 | Oyman | H04L 65/1016 |
| 2019/0322299 | A1* | 10/2019 | Mong | B61L 15/0072 |
| 2019/0324439 | A1* | 10/2019 | Cella | G05B 23/0294 |
| 2019/0324444 | A1* | 10/2019 | Cella | G06N 3/088 |
| 2019/0334643 | A1* | 10/2019 | Neugeboren | H04J 3/0673 |
| 2019/0386924 | A1* | 12/2019 | Srinivasan | H04L 47/122 |
| 2020/0090508 | A1* | 3/2020 | Baker | G08G 1/081 |
| 2020/0106542 | A1* | 4/2020 | Liu | G06F 1/12 |
| 2020/0259896 | A1* | 8/2020 | Sachs | H04L 67/12 |
| 2020/0412813 | A1* | 12/2020 | Mong | B61L 15/0036 |
| 2021/0006614 | A1* | 1/2021 | Oyman | H04N 19/30 |
| 2021/0014177 | A1* | 1/2021 | Kasichainula | H04L 49/901 |
| 2021/0360319 | A1* | 11/2021 | Chari | H04L 12/2869 |
| 2021/0399797 | A1* | 12/2021 | Khan | H04W 36/085 |
| 2021/0399820 | A1* | 12/2021 | Hoptroff | H04J 3/0655 |
| 2022/0006547 | A1* | 1/2022 | Hoptroff | H04J 3/0673 |
| 2022/0086669 | A1* | 3/2022 | Yao | H04L 43/20 |
| 2022/0107184 | A1* | 4/2022 | Omr | G06N 3/0464 |
| 2022/0109622 | A1* | 4/2022 | Yeh | H04L 67/10 |
| 2022/0116334 | A1* | 4/2022 | Zhu | H04L 49/901 |
| 2022/0123850 | A1* | 4/2022 | Adrian | H04J 3/0697 |
| 2022/0124043 | A1* | 4/2022 | Zhu | H04L 47/2475 |
| 2022/0200919 | A1* | 6/2022 | DeLay | H04L 47/52 |
| 2022/0232495 | A1* | 7/2022 | Chai | H04W 56/001 |
| 2022/0256436 | A1* | 8/2022 | Guo | H04L 47/34 |
| 2022/0263677 | A1* | 8/2022 | Neugeboren | H04N 21/6118 |
| 2022/0268943 | A1* | 8/2022 | Gomez | G01S 19/23 |
| 2022/0278745 | A1* | 9/2022 | Qu | H04J 3/0641 |
| 2022/0286501 | A1* | 9/2022 | Musumeci | H04L 67/101 |
| 2023/0032204 | A1* | 2/2023 | Matsumoto | H04L 7/0041 |
| 2023/0100543 | A1* | 3/2023 | Andres Maldonado | |
| | | | | H04J 3/0652 |
| | | | | 370/503 |
| 2023/0179531 | A1* | 6/2023 | Fujiwara | H04N 21/2404 |
| | | | | 370/252 |
| 2023/0239817 | A1* | 7/2023 | Lins De Medeiros | |
| | | | | H04L 5/1469 |
| | | | | 370/503 |
| 2023/0318976 | A1* | 10/2023 | Agarwal | H04W 74/08 |
| | | | | 370/235 |
| 2023/0379385 | A1* | 11/2023 | Mong | H04L 45/66 |
| 2024/0187331 | A1* | 6/2024 | Ding | H04W 76/12 |
| 2024/0356687 | A1* | 10/2024 | Speicher | H04J 3/0667 |
| 2024/0373374 | A1* | 11/2024 | Andrés Maldonado | H04J 3/12 |
| 2024/0373382 | A1* | 11/2024 | Matsunaga | H04L 7/0033 |
| 2024/0421930 | A1* | 12/2024 | Yamagata | G04R 20/02 |
| 2025/0071040 | A1* | 2/2025 | Wang | G16Y 40/50 |
| 2025/0184809 | A1* | 6/2025 | Bush | H04W 24/02 |

FOREIGN PATENT DOCUMENTS

| | | | | | |
|---|---|---|---|---|---|
| EP | | 3231111 | B1 * | 7/2024 | H04J 3/0667 |
| KR | | 20220107467 | A * | 8/2022 | H04L 7/0008 |
| WO | WO-2013163310 | A1 * | 10/2013 | | H04L 67/12 |
| WO | WO-2020221165 | A1 * | 11/2020 | | H04W 72/12 |
| WO | WO-2021253725 | A1 * | 12/2021 | | H04L 47/215 |
| WO | WO-2022073583 | A1 * | 4/2022 | | H04L 47/263 |

* cited by examiner

Figure 1A:
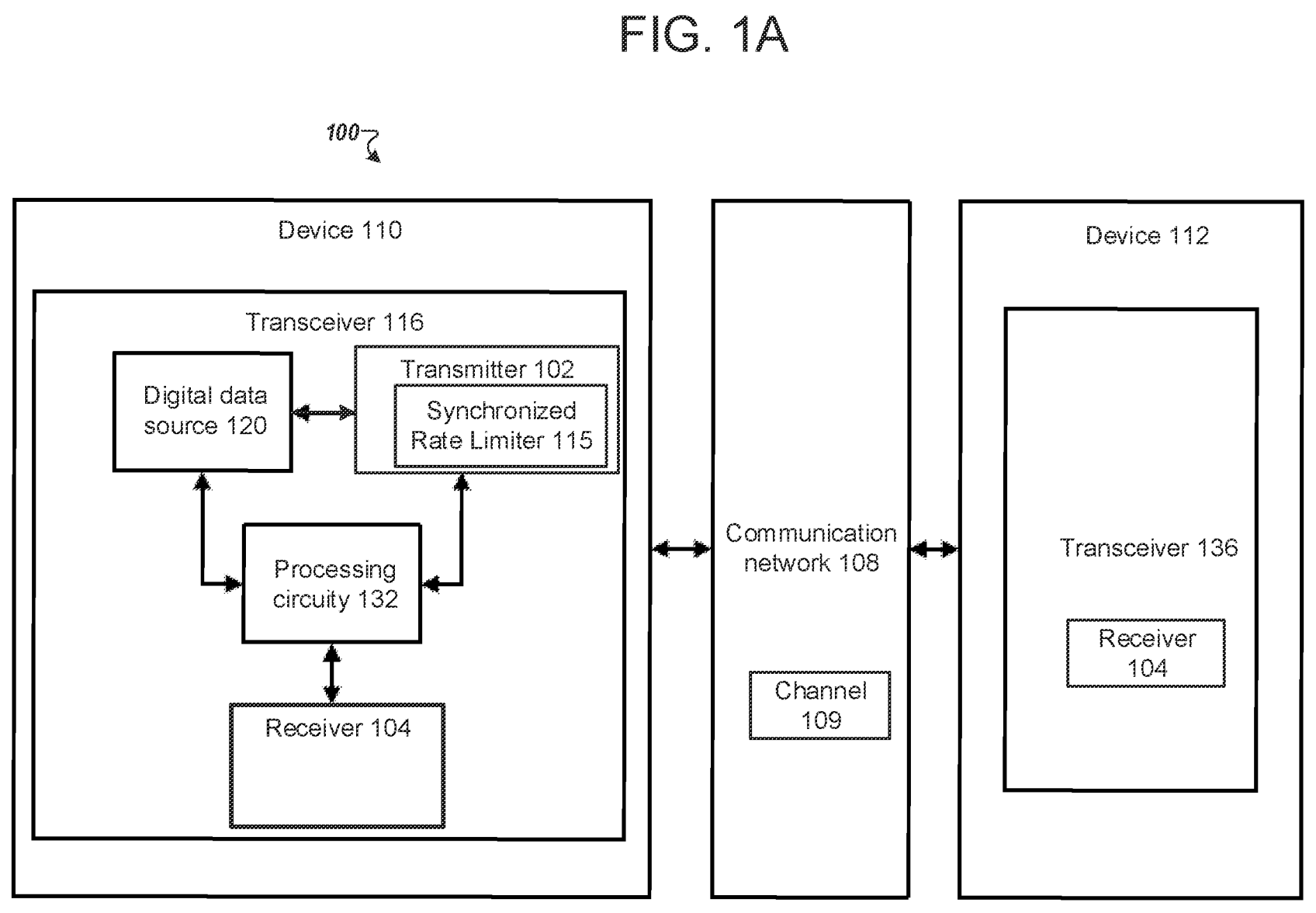

Device 112

Transceiver 136

Receiver 104

Communication network 108

Channel 109

Device 110

Transceiver 116

Transmitter 102

Synchronized Rate Limiter 115

Processing circuity 132

Receiver 104

Digital data source 120

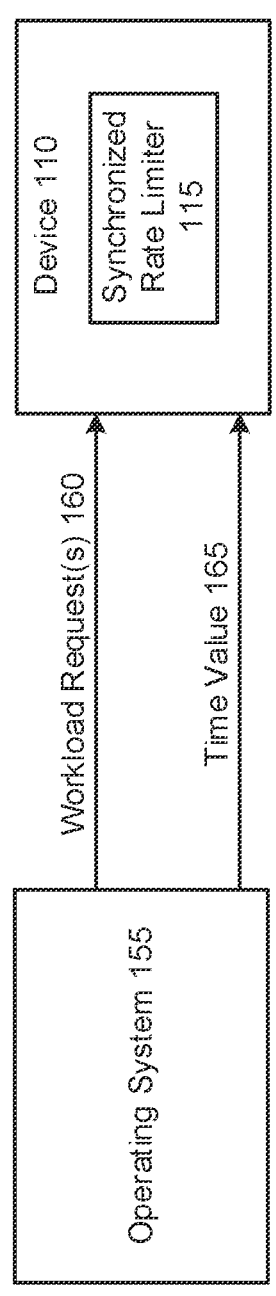
FIG. 1B

400

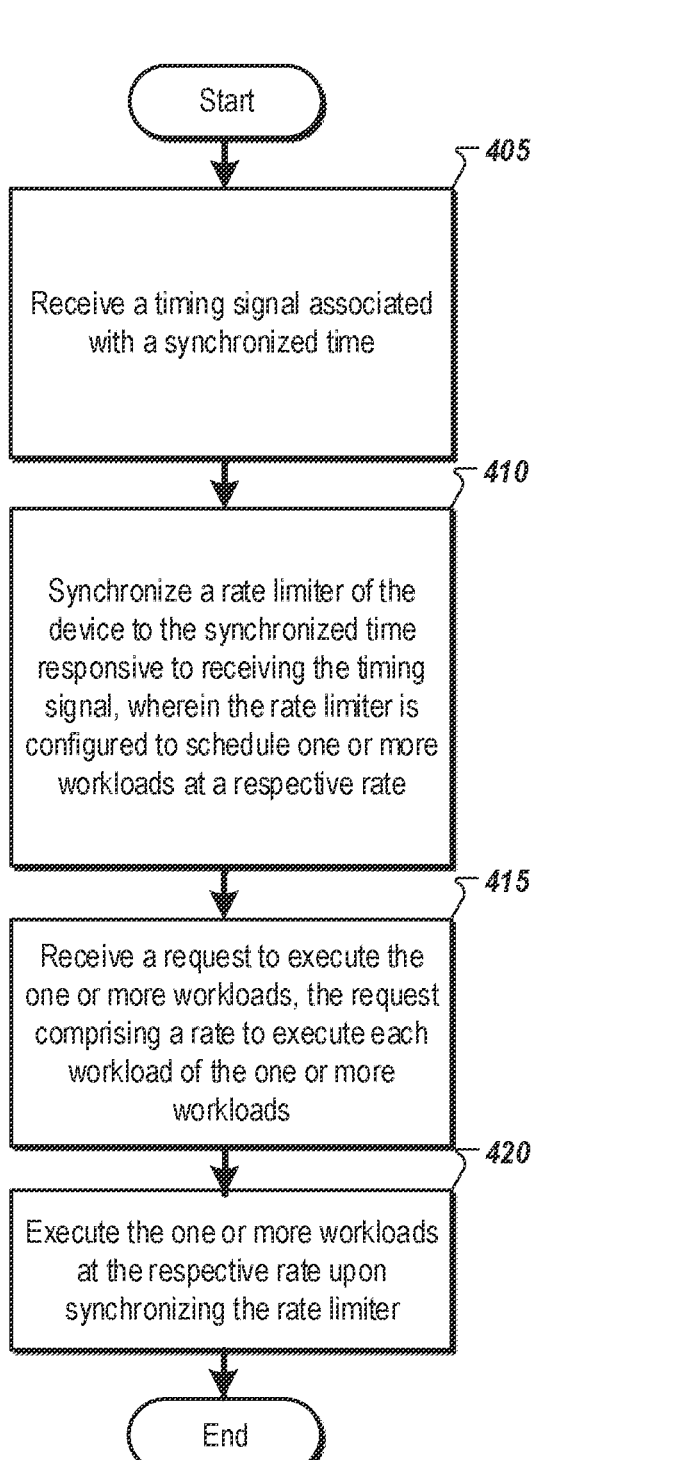

Start

405

Receive a timing signal associated with a synchronized time

410

Synchronize a rate limiter of the device to the synchronized time responsive to receiving the timing signal, wherein the rate limiter is configured to schedule one or more workloads at a respective rate

415

Receive a request to execute the one or more workloads, the request comprising a rate to execute each workload of the one or more workloads

420

Execute the one or more workloads at the respective rate upon synchronizing the rate limiter

End

FIG. 4

SYNCHRONIZED RATE CONTROL AT RATE LIMITER

RELATED APPLICATIONS

This application claims the benefit of priority from U.S. Provisional Application No. 63/339,538 filed May 9, 2022, the entire contents of which are hereby incorporated by reference herein.

TECHNICAL FIELD

At least one embodiment pertains to processing resources used to perform and facilitate rate limiting and pacing. For example, at least one embodiment pertains to technology for synchronized rate limiting. For example, at least one embodiment relates to synchronizing a rate limiter to a real world or local time.

BACKGROUND

A device can receive and execute workload requests—e.g., transmit packets, perform an operation on data, etc. Some devices can include a rate limiter or rate pacing mechanism to control a rate of requests received or workloads executed—e.g., the device can include a rate limiter or rate pacing mechanism to ensure a number of workload requests does not exceed a threshold limit of the device. This can ensure the device is able to handle the workload requests in an efficient manner. Rate limiting, traffic shaping, rate pacing can be critical in computer network applications such as data center communication, media streaming, and congestion control algorithms—e.g., rate limiting can be used to avoid burst traffic and reduce congestion. For example, the device can be a network device that transmits packets—e.g., the device can transmit packets associated with video streaming to user devices. To ensure the packets are transmitted reliably and without congestion, the device can use a rate limiter to execute workloads at a desired rate. For example, the device can include a rate limiter to have a constant bit rate transmitted and to ensure bandwidth is satisfied. In some communication systems, the device is to execute workloads at a specific time—e.g., the workload execution is to be synchronized with a time. For example, media streaming applications (e.g., video streaming), can require strict and demanding network traffic patterns and need data to be transmitted synchronized to a real-world time. Some communication systems can attempt to execute workloads at specific times by utilizing an internal clock or timer. However, the device internal clock can have built in inaccuracies and drift with respect to a real world time. Accordingly, the communication systems can fail to synchronize their workload execution.

BRIEF DESCRIPTION OF DRAWINGS

Various embodiments in accordance with the present disclosure will be described with reference to the drawings, in which:

FIGS. 1A and 1B are example communication systems, in accordance with at least some embodiments;

FIG. 4 is a flow diagram of a method for synchronized rate control at a limiter, in accordance with at least some embodiments

DETAILED DESCRIPTION

Figure 2:
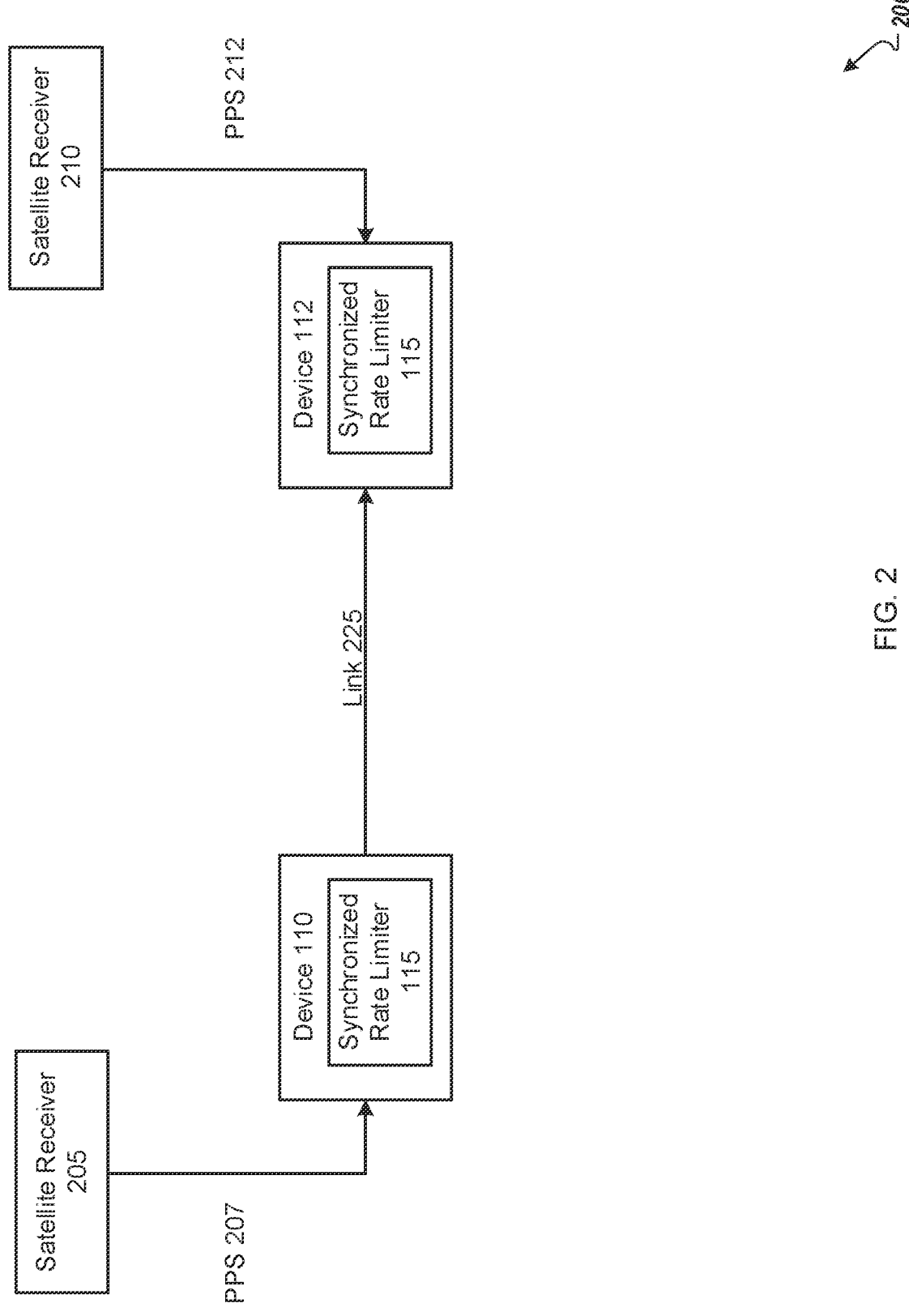
FIG. 2 illustrates an example communication system for synchronized rate control at a limiter, in accordance with at least some embodiments.

As described above, some devices require synchronized workload execution—e.g., some devices need to execute workloads at a specific time or synchronized with a real-world time. For example, media streaming applications can require strict and demanding network traffic patterns and need workloads to be executed and transmitted synchronized to a real-world time—e.g., transmitting a video stream at a precise rate can require synchronization between a receiver and sender or synchronizing the execution to a real world time. Synchronizing to a real world time can enable devices to execute workloads to that a transmitted frame rate is according to a desired time. Conventional devices can attempt to execute workloads (e.g., transmit packets) at a specific time by utilizing an internal clock or timer. The device can utilize an oscillator for time synchronization. However, the oscillator can have inaccuracies that cause the execution to be inaccurate with respect to the real world time. For example, specifications can require an oscillator with an error tolerance of less than 100 parts per million (PPM)—e.g., for 100 gigabits per second (Gbps) Ethernet specifications, a 100 PPM oscillator may be required which can cause 100 microseconds of drift every one (1) second. In some devices, the oscillator can cause constant drift resulting in accumulated accuracy errors. As an illustrative example, if a media streaming is to send a packet once every second and has a 100 PPM error, 10,000 workloads can be executed over 9,999 to 10,001 seconds—e.g., the oscillator can cause a drift of up to plus or minus 100 microseconds every second equating to a whole second over the course of executing 10,000 workloads. Additionally, the oscillation rate can be vary based on temperature fluctuations and aging (e.g., the error or drift rate can increase over time). Accordingly, the actual drift or error rate of the oscillator can be difficult to predict at any given time.

Advantageously, aspects of the present disclosure can address the deficiencies above and other challenges by providing a system and a method for synchronizing a rate limiter. For example, a device can synchronize a rate limiter to a real world or local time using a precision time protocol (PTP) or a pulse per second (PPS) signal from global navigation satellite system (GNSS). The device can utilize the PPS or PTP to store a real world or local time internally. The device can then use the stored time when requested—e.g., software can request the device utilize the stored time for the rate limiter. In at least one example, the device can use the stored time universally or for a certain application or resource—e.g., use the stored time at the rate limiter on a per mechanism, per rate, per flow, per Virtual Machine (VM), etc. Additionally, the device can refrain from using the real world time or local time if the time becomes unreliable or unavailable. In such examples, the device can utilize a holdover mode and switch to an internal clock until the real world time or local time is valid again—e.g., received again. Accordingly, the device can resynchronize and compensate for any errors that occurred during the holdover mode—e.g., compensate for the drift occurring from the oscillator.

By utilizing a rate limiter that is synchronized according to a local time or real world time, the system can execute workloads at a desired time—e.g., the device can transmit packets in accordance with a real world or local time to achieve a desired transmittal rate. Accordingly, network traffic can be limited or paced to as required—e.g., rate limit or pace network traffic to achieve a target frame rate.

FIG. 1A illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as processing devices including a central processing unit (CPU), graphics processing unit (GPU) and/or data processing unit (DPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals). In some embodiments, the communication network 108 can include one or more paths associated with transmitting data and one more paths associated with transmitting a clock signal.

The device 110 may include a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 may include suitable software and/or hardware for receiving digital data from the digital data source 120 and outputting data signals according to the digital data for transmission over the communication network 108 to a receiver 104 of device 112. In at least one embodiment, the transmitter 102 can include a synchronized rate limiter 115—e.g., a hardware component configured to schedule workloads and pace overall network traffic. In at least one embodiment, the synchronized rate limiter 115 is configured to receive a real world or local time. For example, the rate limiter 115 can receive a precision time protocol (PTP) time or a pule per second (PPS) signal from a global navigation satellite system (GNSS) or global positioning system (GPS). In such examples, the rate limiter 115 can store the real world value (e.g., or utilize a free running counter or a translation formula corresponding to the real world time). In some examples, the rate limiter 115 can receive a workload request indicating to utilize the real world or local time. In such examples, the rate limiter 115 can utilize the stored value to schedule workloads at the desired rate.

The receiver 104 of device 110 and 112 may include suitable hardware and/or software for receiving signals, such as data signals from the communication network 108. For example, the receiver 104 may include components for receiving processing signals to extract the data for storing in a memory, as described in detail below with respect to FIG. 2-FIG. 5.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

FIG. 1B illustrates an example communication system 150 according to at least one example embodiment. The system 150 can include a device 110 and an operating system 155. In some embodiments, the device 110 can include a synchronized rate limiter 115. In some embodiments, the operating system 155 can be included in the device 110, and the synchronized rate limiter 115 can be included in transceiver 116 as described with reference to FIG. 1A. In some embodiments, the operating system 155 can be included in a host device or host system that includes the device 110 or is coupled to the device 110.

In at least one embodiment, the operating system 155 is configured to transmit workload request(s) 160 to device 110. In some embodiments, the operating system 155 can also transmit a respective rate value indicating a rate to execute each workload request(s) 160. In some embodiments, the rate value is transmitted within the workload request(s) 160. In at least one embodiment, the rate value includes two or more numbers—e.g. the rate value can be a fractional value including a numerator and a denominator. In at least one embodiment, the rate value can include an integer plus a numerator and a denominator.

In some embodiments, the operating system 155 is configured to transmit the rate value to device 110 to configure the rate value to certain resources or components of device 110. For example, the operating system 155 can transmit the rate value to associate the rate value to a work queue of device 110, a network flow of device 110, to a virtual machine (VM) of device 110, to a host device of a multi-host system within system 150, to a respective memory space range (e.g., to a respective memory address range), or to a link priority—e.g., the operating system 155 can configure the rate value to an Ethernet priority of device 110. In some embodiments, the operating system 155 can transmit multiple rate values in parallel—e.g., the operating system 155 can transmit multiple workload requests 160 in parallel and a respective rate value for each workload request 160. Accordingly, the device 110 can be configured to process multiple workloads each having a different rate value in parallel.

In at least one embodiment, the operating system 155 is configured to transmit a time value 165. For example, the operating system 155 can transmit a real world or local time to device 110. In some embodiments, the operating system 155 can transmit a time value 165 corresponding to a pulse per second (PPS) signal received from a global positioning system (GPS) or a global navigation satellite system (GNSS) or corresponding to a precision time protocol (PTP) received. In at least one embodiment, the device 110 can store the time value 165. In some embodiments, the device 110 can receive the time value 165 directly from the GNSS, GPS, or PTP.

In some embodiments, the operating system 155 is configured to indicate to the device 110 to utilize the time value 165 when executing a respective workload request(s) 160. For example, the operating system 155 can transmit a workload request 160 that indicates to utilize a time value 165 and transmit a packet at a real world round second— e.g., at 7:00:00, 7:00:01, 7:00:02, and so forth. In some embodiments, the operating system 155 can indicate to the device 110 to utilize time value 165 for a specific resource— e.g., associate the time value 165 to a work queue of device 110, a network flow of device 110, to a virtual machine (VM) of device 110, to a host device of a multi-host system within system 150, to a respective memory space range (e.g., to a respective memory address range), or to a link priority, etc.

In at least one embodiment, device 110 is configured to receive workload requests 160 and one or more time values 165 from the operating system 155. In some embodiments, the device 110 is configured to execute one or more workloads received based on the time value 165—e.g., execute an application, service, capability, or collection of resources and code at a target real world or local time. For example, the device 110 can be configured to process data or perform an operation responsive to receiving the workload request(s) 160. In some embodiments, the device 110 can be an example of a network device—e.g., a network interface card (NIC), network switch, network adapter, data processing unit (DPU), etc. In such embodiments, the device 110 can transmit and receive packets as part of executing a workload request—e.g., transmit packets to coupled user devices in response to receiving the workload request(s) 160.

In at least one embodiment, device 110 can determine that time value 165 is unreliable or unavailable. For example, the device 110 can determine the time value 165 has not been received or was received at a duration that exceeds a threshold—e.g., the device 110 can determine a duration since a previous time value 165 is received exceeds a threshold duration associated with an accurate time value 165. In such embodiments, the device 110 can instead rely on an internal clock until a new time value 165 is received— e.g., utilize an internal oscillator until device 110 is resynchronized. In at least one embodiment, the device 110 can receive a new time value 165 some duration after determining that the time value 165 is unreliable. In such embodiments, the device 110 can resynchronize to a real world or local time based on receiving the new time value 165. In at least one embodiment, the device 110 can further compensate for any drift error that occurred between a time the device determined the time value 165 is unreliable and resynchronizing—e.g., the device 110 can determine a rate for packet transmission during the time the device determined the time value 165 is unreliable and resynchronizing and compensate between the determined rate and a target rate. For example, the device 110 can determine packets were transmitted at a rate of 1.001 packets per a second and a target rate is one packet per second. The device 110 can compensate for a difference between the actual rate and the target rate by transmitting a subsequent packet at a rate of 0.999 packets per second until the overall rate of the traffic transmitted is at the target rate—e.g., at the target rate of one packet per second. In at least one embodiment, the device 110 can return to transmitting at the target rate once done compensating for the drift.

FIG. 2 illustrates an example communication system 200 according to at least one example embodiment. The system 200 can include device 110 and device 112 as described with reference to FIG. 1. In some embodiments, device 110 and device 112 can include a synchronized rate limiter 115 as described with reference to FIGS. 1A and 1B. In at least one embodiment, the system 200 can include a satellite receiver 205 or satellite receiver 210. In some embodiments, the device 110 and device 112 can be coupled by a link 225. In some embodiments, the link 225 can be an example of communication network 108 as described with reference to FIG. 1. In at least one embodiment, the link 225 can an example of an Ethernet link. In some embodiments, the system 200 can illustrate a method of synchronizing a rate limiter using a satellite receiver 205. In at least one embodiment, the system 200 can represent a video streaming sender system with a test equipment receiver. In such embodiments, the device 110 can be a device that transmits data to device 112 and device 112 can be an example of a testing device. In embodiments where the device 112 is a testing device, the system 200 can validate a performance and timing accuracy of data (e.g., packets or video stream) transmitted between device 110 and device 112.

In at least one embodiment, satellite receiver 205 is configured to transmit a pulse per second (PPS) signal 207 to device 110. For example, satellite receiver 205 is configured to transmit an electrical signal that has a width of less than one second. In some embodiments, the PPS can be transmitted accurate once every second—e.g., the satellite receiver 205 can accurately repeat transmitting a signal exactly after one second. In some embodiments, the satellite receiver 205 is configured to transmit a PPS signal 207 associated with a real world time. For example, satellite receiver 205 can transmit a PPS 207 every round second—e.g., at 5:00:00, 5:00:01, 5:00:02, and so forth. In some embodiments, the satellite receiver 205 can transmit the PPS 207 until the device 110 is synchronized to a real world time—e.g., until device 110 determine a real world time from the PPS 207. In at least one embodiment, the satellite receiver 205 is an example of a receiver in a global positioning system (GPS) or global navigation satellite system (GNSS).

In some embodiments, satellite receiver 210 is configured to transmit a PPS 212 to device 112. In some embodiments, satellite receiver 210 is the same as satellite receiver 205—e.g., both device 110 and device 112 can receive a signal from a same satellite system. In some embodiments, the satellite receiver 210 is configured to transmit a PPS 212 that corresponds to or is the same as PPS 207. For example, the satellite receiver 210 could also transmit a PPS signal at a time 5:00:00, 5:00:01, 5:00:02 if the satellite receiver 205 transmits a signal at the time 5:00:00, 5:00:01, 5:00:02. Accordingly, device 110 and device 112 can be synchronized—e.g. both device 110 and device 112 can be synchronized to a same real world tie or to a real world round second. In at least one embodiment, the satellite receiver 210 is an example of a receiver in a global positioning system (GPS) or global navigation satellite system (GNSS).

In at least one embodiment, device 110 is configured to store a real world time value associated with satellite receiver 205 and the PPS 207—e.g., the device 110 can store a real time clock or a precision time protocol (PTP) hardware clock (PHC). In some embodiments, the device 110 can store a value (e.g., a free running counter or a translation formula) that corresponds to the real world time. In at least one embodiment, the device 110 can be configured the synchronized rate limiter 115 in accordance with the stored value—e.g., in accordance with a real world time associated with PPS 207. In some embodiments, the rate limiter 115 is configured to schedule a workload in accordance with the real world time. For example, the rate limiter 115 can transmit a packet or data to device 112 via link 225 at a target real world time In at least one embodiment, device 112 is configured to store a real world time associated with satellite 210 and the PPS 212—e.g., the device 112 can store a real time clock or a precision time protocol (PTP) hardware clock (PHC). In some embodiments, the device 112 can store a value (e.g., a free running counter or a translation formula) that corresponds to the real world time. In at least one embodiment, the device 112 can be configured to synchronize the rate limiter 115 in accordance with the stored value—e.g., in accordance with a real world time associated with PPS 207.

In some embodiments, device 112 is configured to receive data or packets from device 110 via the link 225. For example, the device 112 can receive a packet or data from device 110 via a link 225 at a target real world time. In some embodiments, the system 200 can perform a test to determine an accuracy of synchronization between device 110 and device 112. For example, the system 200 can determine a time the device 110 transmitted a packet and a time the device 112 received a packet or data. In some embodiments, the system 200 can determine whether the packet was transmitted and/or received at a target real world time. In some embodiments, the system 200 can repeat a synchronization attempt as described herein if the device 110 and device 112 are not synchronized—e.g. can retry synchronization if a packet is received or transmitted not in accordance with a desired rate or real world time.

Figure 3:
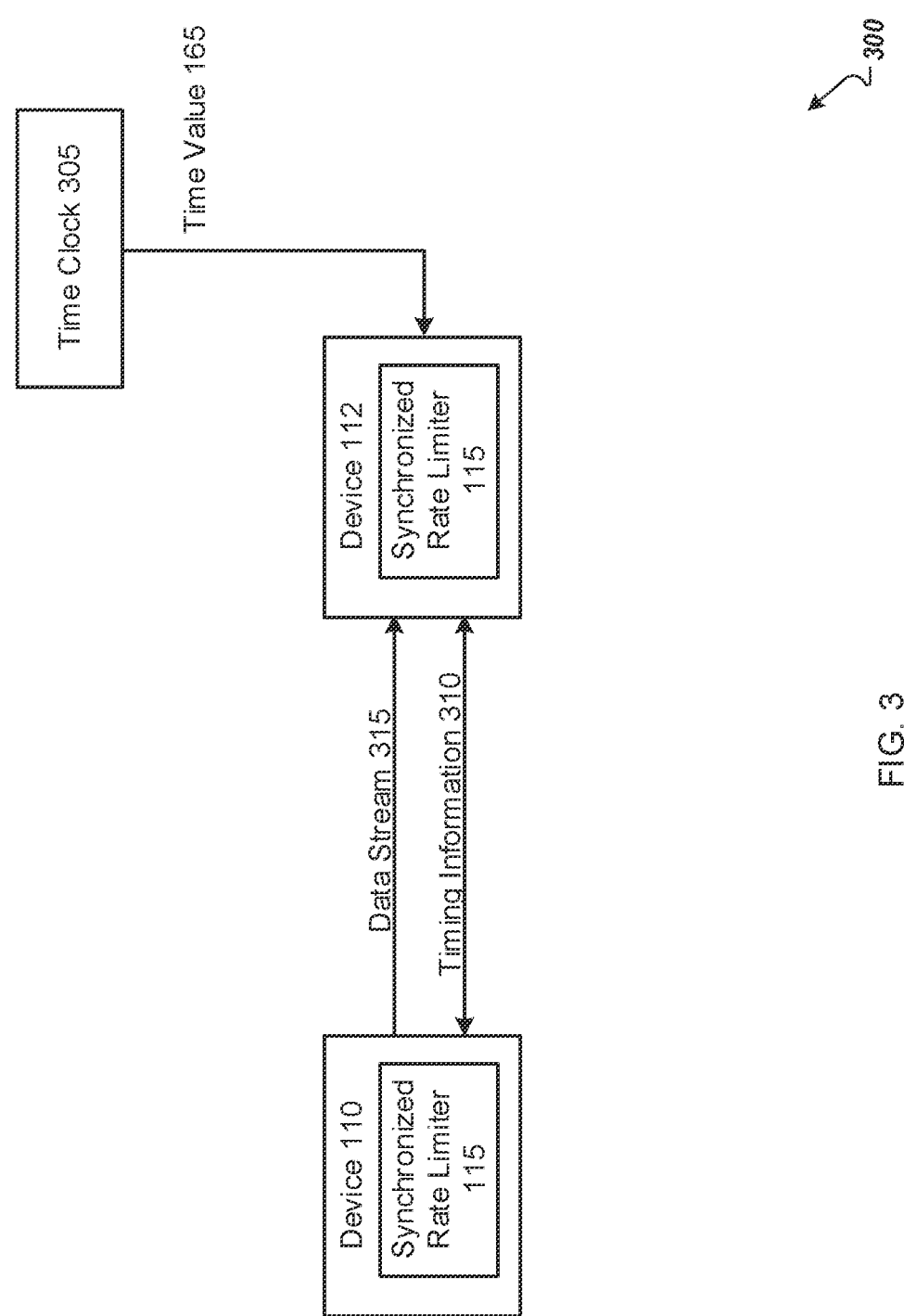
FIG. 3 illustrates an example communication system for synchronized rate control at a limiter, in accordance with at least some embodiments.

FIG. 3 illustrates an example communication system 300 according to at least one example embodiment. The system 300 can include device 110 and device 112 as described with reference to FIG. 1. In some embodiments, device 110 and device 112 can include a synchronized rate limiter 115 as described with reference to FIGS. 1A and 1B. In at least one embodiment, the system 200 can include a satellite a time clock 305. In some embodiments, the device 110 and device 112 can be coupled by a communication network 108 as described with reference to FIG. 1. In some embodiments, the system 200 can illustrate a method of synchronizing a rate limiter using a precision time protocol (PTP).

In at least one embodiment, time clock 305 is configured to transmit a time value 165 to device 112. In some embodiments, time clock 305 can be an example of a precision time protocol (PTP) grandmaster clock. In at least on embodiment, the time clock 305 can store a real world time. For example, the time clock 305 can be configured to receive a signal (e.g., receive a pulse per second (PPS) signal) from a global positioning system (GPS) or global navigation satellite system (GNSS) system. In such examples, the time clock 305 can store a real world based on receiving the signal from the satellite. In some embodiments, the time clock 305 can synchronize device 112 by transmitting timestamped messages according to the precision time protocol (PTP)—e.g., the time clock 305 can exchange messages that enable the device 112 to determine a transport latency to eliminate time offset between device 112 and time clock 305. That is, the time value 165 can correspond to or represent a series of time stamped messages between the time clock 305 and device 112. As the system 300 is an example of a PTP system, the time clock 305 can be the only device receiving a signal from a satellite—e.g., the remaining devices or nodes in the system can be synchronized according to the time clock 305.

In at least one embodiment, device 112 is configured to receive and store the time value 165 from time clock 305. For example, the device 112 is configured to receive one or more time stamped messages from time clock 305 that enable the device 112 to determine a latency and eliminate time offset between time clock 305 and device 112—e.g. the device 112 is configured to synchronize to time clock 305 based on receiving the time stamped messages. In at least one embodiment, the device 112 can configure the synchronized rate limiter 115 responsive to receiving the time value 165. For example, the device 112 can synchronize the rate limiter 115 to the time value 165. In at least one embodiment, device 112 can be an example of a receiver e.g., the device 112 can receive information from device 110.

In some embodiments, device 112 can synchronize the device 110 to device 112—e.g., device 112 is synchronized to the time clock 305 and the device 110 is synchronized to the device 112. In at least one embodiment, the device 112 is configured to transmit timing information 310 to device 110 as part of a synchronization operation. In at least one embodiment, the timing information 310 corresponds to the PTP. For example, the device 112 can transmit to and receive from device 110 timestamped messages. This can enable the device 110 to determine a transport latency and eliminate time offset between device 110 and device 112. For example, the device 112 can transmit a first message with a first time stamp, device 110 can receive the first message, record the first time stamp, and transmit a second message with a second time stamp. The device 112 is configured to receive the second message and transmit a third message with a third time stamp. In at least one embodiment, the device 110 can receive the third message and record a fourth time stamp. In some embodiments, the device 110 can determine a delay associated with transmitting a message over communication network 108—e.g., the device 110 can determine a time associated with transmitting a message by taking a difference between the second and first time stamps and taking a difference between the fourth and third time stamps. Accordingly, device 112 and device 110 can be synchronized to a real world time—e.g., to time value 165 received from time clock 305.

In at least one embodiment, device 110 is configured to transmit data (e.g., a data stream 315) to device 112 in accordance with the synchronized time value 165. For example, the device 110 is configured to synchronize the rate limiter 115 in accordance with the timing information 310. After synchronizing the rate limiter 115, the device 110 can receive a workload request indicating to execute the workload in accordance with a real world time. In such examples, the device 110 can execute the workload at the indicated time utilizing the synchronized rate limiter 115—e.g., transmit data stream 315 at the indicated real world time.

FIG. 4 illustrates a flow diagram of a method 400 for synchronizing a rate limiter according to at least one example embodiment. The method 400 can be performed by processing logic comprising hardware, software, firmware, or any combination thereof. In at least one embodiment, the method 400 is performed by device 110, device 112, satellite receiver 205, satellite 210, or time clock 305 as described with reference to FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 405, processing logic can receive a timing signal associated with a synchronized time—e.g., receive a real world time, a pulse per second (PPS) signal, a precision time protocol (PTP) message as described with reference to FIG. 1-3. In at least one embodiment, the processing logic is configured to receive the timing signal from a first global navigation satellite system (GNSS) or a global positioning system (GPS). In some embodiments, the processing logic is configured to receive a timing signal from a third device—e.g., from a time clock 305 as described with reference with FIG. 3. In at least one embodiment, the third device is configured to generate the timing signal (e.g., a PTP message) associated with the synchronized time and transmit the timing signal to the processing logic. In at least one embodiment, the synchronized time is a real world time or a precision time protocol (PTP) time.

At operation 410, processing logic can synchronize a rate limiter of the device to the synchronized time responsive to receiving the timing signal, where the rate limiter is configured to schedule one or more workloads at a respective rate. For example, the processing logic can synchronize the rate limiter to a real world time or a local time.

At operation 415, the processing logic can receive a request to execute the one or more workloads, the request including a rate to execute each workload of the one or more workloads. In some embodiments, the request can include to execute the workload at a specific time—e.g., a real world time. In such embodiments, the processing logic can execute the workload at the specific time indicated based on the synchronization.

At operation 420, the processing logic can execute one or more workloads at the respective rate upon synchronizing the rate limiter. In at least one embodiment, the system can include a second device. In such embodiments, the second device is coupled to the device via a link. In some embodiments, the second device is configured to receive a second timing signal associated with the synchronized time—e.g., the processing logic can receive a second PPS signal from a second satellite device as described with reference to FIG. 2. In at least one embodiment, the second device is configured to synchronize a second rate limiter of the second device to the synchronized time responsive to receiving the second timing signal, wherein the second rate limiter is configured to receive data associated with the one or more workloads at the respective rate. In some embodiments, the second device is configured to receive the timing information from a second GNSS. In at least one embodiment, the second device is configured to transmit the timing signal to the second device, wherein the second device is configured to synchronize a second rate limiter of the second device to the synchronized time responsive to receiving the timing signal, wherein the second rate limiter is configured to receive data associated with the one or more workloads at the respective rate—e.g., the device can synchronize the second device as described with reference to FIG. 3.

In at least one embodiment, the processing logic can determine the device is not synchronized to the timing signal and execute the one or more workloads according to an internal clock of the rate limiter. For example, the processing logic can determine to go into a holdover mode as described with reference to FIG. 1B. In such examples, the processing logic can receive a second timing signal associated with the synchronized time and synchronize the rate limiter of the device to the synchronized time responsive to receiving the second timing signal—e.g., the processing logic can resynchronize the device according to a new real world time value. In some embodiments, the processing logic can further determine an error associated with executing the one or more workloads according to the internal clock and adjust a rate of executing the one or more workloads responsive to determining the error associated with executing the one more workloads—e.g., the processing logic can compensate for any error that occurred while using the internal clock as described with reference to FIG. 1B.

Figure 5:
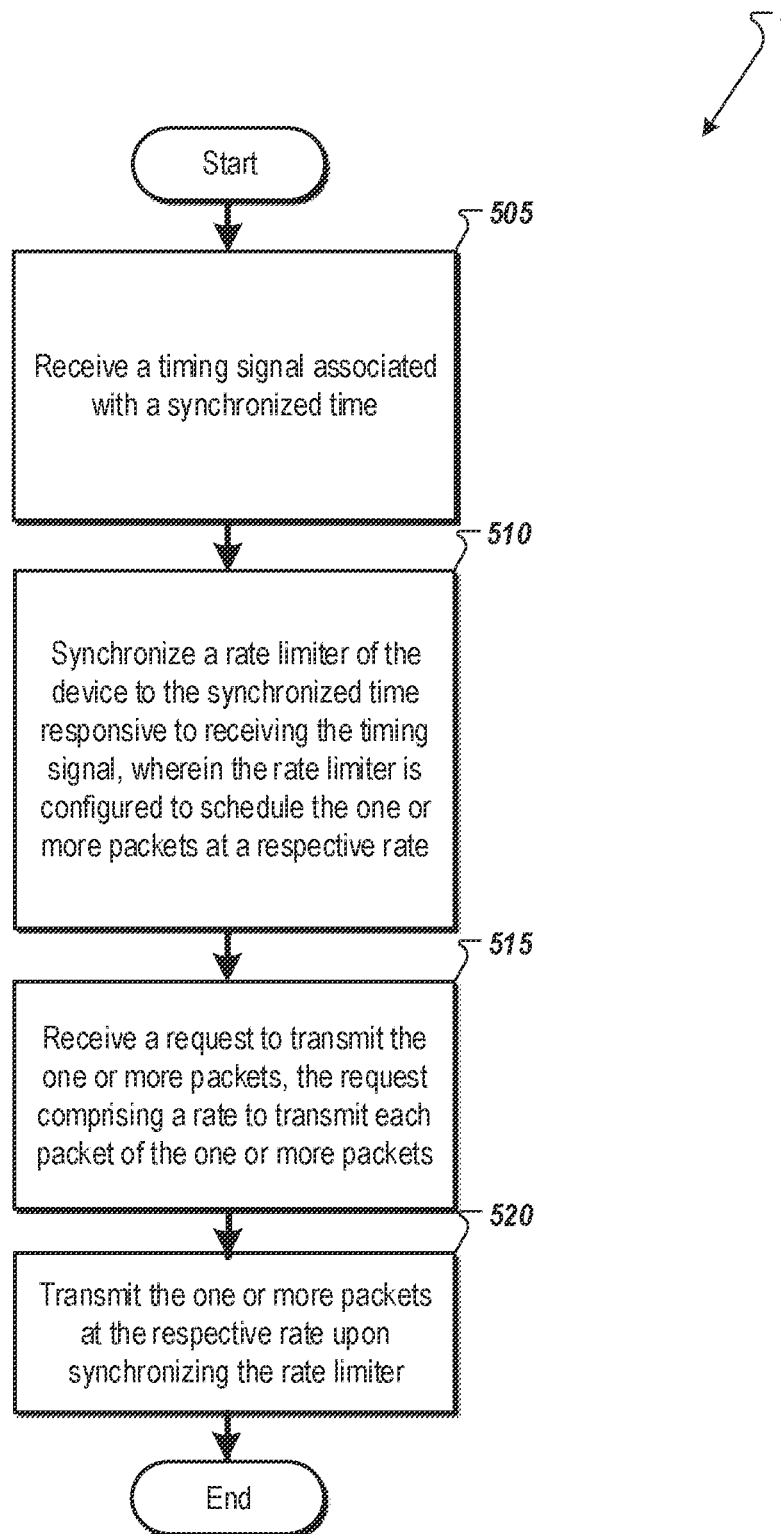
FIG. 5 is a flow diagram for a method for synchronized rate control at a limiter, in accordance with at least some embodiments.

FIG. 5 illustrates a flow diagram of a method 500 for synchronizing a rate limiter according to at least one example embodiment. The method 500 can be performed by processing logic comprising hardware, software, firmware, or any combination thereof. In at least one embodiment, the method 500 is performed by device 110, device 112, satellite receiver 205, satellite 210, or time clock 305 as described with reference to FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 505, processing logic can receive a timing signal associated with a synchronized time—e.g., receive a real world time, a pulse per second (PPS) signal, a precision time protocol (PTP) message as described with reference to FIG. 1-3. In at least one embodiment, the processing logic is configured to receive the timing signal from a first global navigation satellite system (GNSS) or a global positioning system (GPS). In some embodiments, the processing logic is configured to receive a timing signal from a third device—e.g., from a time clock 305 as described with reference with FIG. 3. In at least one embodiment, the third device is configured to generate the timing signal (e.g., a PTP message) associated with the synchronized time and transmit the timing signal to the processing logic. In at least one embodiment, the synchronized time is a real world time or a precision time protocol (PTP) time. In at least one embodiment, the processing logic can be in a network device, where the network device is a network interface card (NIC), a network device, or a data processing unit (DPU).

At operation 510, processing logic can synchronize a rate limiter of the device to the synchronized time responsive to receiving the timing signal, where the rate limiter is configured to schedule the one or more packets at a respective rate—e.g., the rate limiter can schedule the transmission of the one or more packets the respective rate. For example, the processing logic can synchronize the rate limiter to a real world time or a local time.

At operation 515, the processing logic can receive a request to transmit the one or more packets, the request including a rate to transmit each packet of the one or more packets. In some embodiments, the request can include to transmit the packets at a specific time—e.g., a real world time. In such embodiments, the processing logic can transmit the packets at the specific time indicated based on the synchronization.

At operation 520, the processing logic can transmit one or more packets at the respective rate upon synchronizing the rate limiter. In at least one embodiment, the system can include a second device. In such embodiments, the second device is coupled to the device via a link. In some embodiments, the second device is configured to receive a second timing signal associated with the synchronized time—e.g., the processing logic can receive a second PPS signal from a second satellite device as described with reference to FIG. 2. In at least one embodiment, the second device is configured to synchronize a second rate limiter of the second device to the synchronized time responsive to receiving the second timing signal, where the second rate limiter is configured to receive data associated with the one or more workloads at the respective rate. In some embodiments, the second device is configured to receive the timing information from a second GNSS. In at least one embodiment, the second device is configured to transmit the timing signal to the second device, wherein the second device is configured to synchronize a second rate limiter of the second device to the synchronized time responsive to receiving the timing signal, where the second rate limiter is configured to receive data associated with the one or more workloads at the respective rate—e.g., the device can synchronize the second device as described with reference to FIG. 3.

In at least one embodiment, the processing logic can determine the device is not synchronized to the timing signal and execute the one or more workloads according to an internal clock of the rate limiter. For example, the processing logic can determine to go into a holdover mode as described with reference to FIG. 1B. In such examples, the processing logic can receive a second timing signal associated with the synchronized time and synchronize the rate limiter of the device to the synchronized time responsive to receiving the second timing signal—e.g., the processing logic can resynchronize the device according to a new real world time value. In some embodiments, the processing logic can further determine an error associated with transmitting the one or more packets according to the internal clock and adjust a rate of transmitting the one or more packets responsive to determining the error associated with transmitting the one more packets—e.g., the processing logic can compensate for any error that occurred while using the internal clock as described with reference to FIG. 1B.

Figure 6:
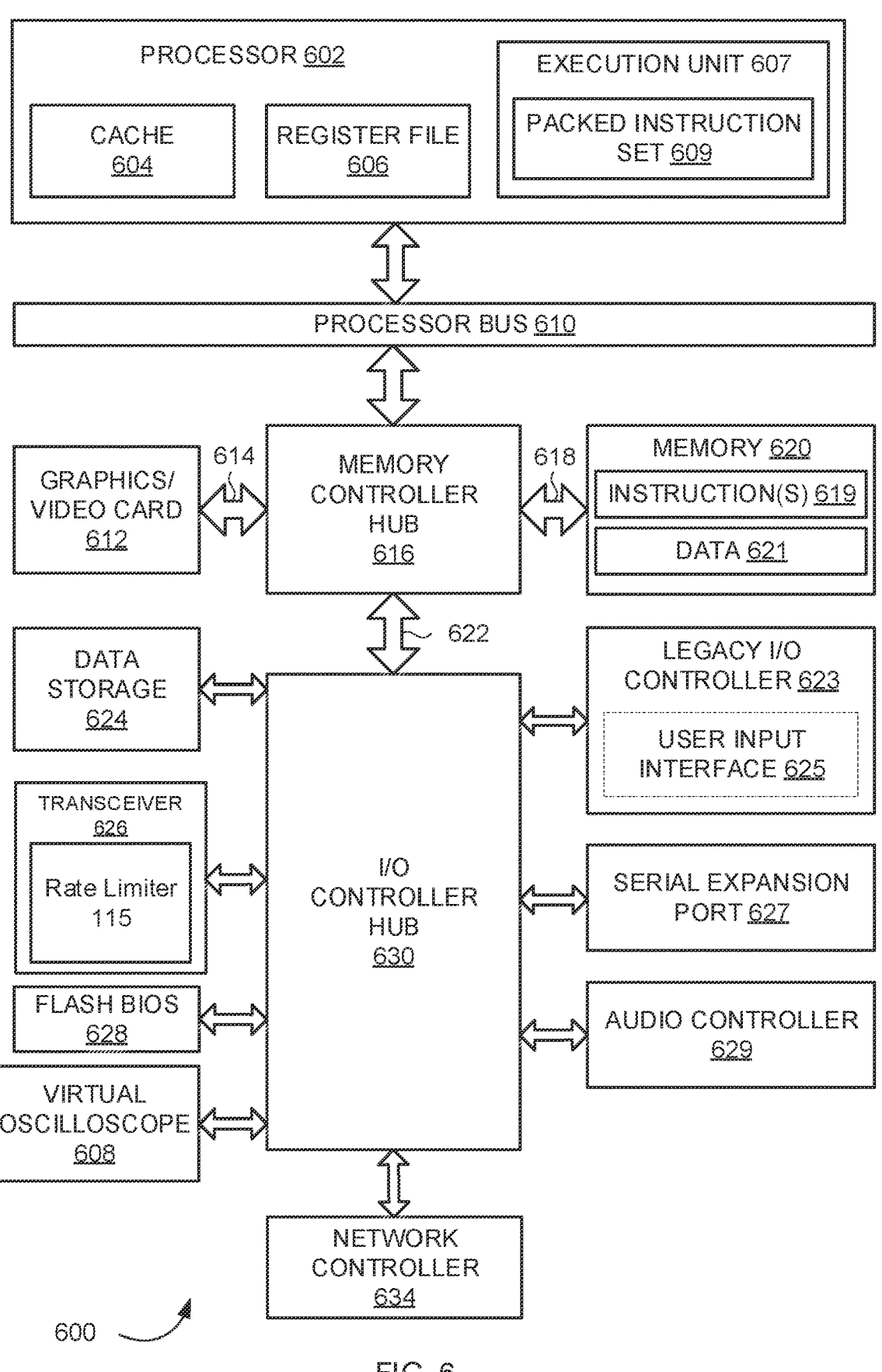
FIG. 6 illustrates an example computer system including a transceiver including a chip-to-chip interconnect, in accordance with at least some embodiments.

FIG. 6 illustrates a computer system 600 in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602 to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 606 may store different types of data in various registers including, without limitation, integer registers, floating point registers, status registers, and instruction pointer register.

In at least one embodiment, execution unit 607, including, without limitation, logic to perform integer and floating point operations, also resides in processor 602. Processor 602 may also include a microcode ("ucode") read only memory ("ROM") that stores microcode for certain macro instructions. In at least one embodiment, execution unit 602 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, flash memory device, or other memory device. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and to bridge data signals between processor bus 610, memory 620, and a system I/O 622. In at least one embodiment, system logic chip may provide a graphics port for coupling to a graphics controller. In at least one embodiment, MCH 616 may be coupled to memory 620 through high bandwidth memory path 618 and graphics/video card 612 may be coupled to MCH 616 through an Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, local I/O bus may include, without limitation, a high-speed I/O bus for connecting peripherals to memory 620, a chipset, and processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may comprise a hard disk drive, a floppy disk drive, a CD-ROM device, a flash memory device, or other mass storage device. In an embodiment, the transceiver 626 includes a constrained FFE 608.

In at least one embodiment, FIG. 6 illustrates a system, which includes interconnected hardware devices or "chips" in a transceiver 626—e.g., the transceiver 626 includes a chip-to-chip interconnect including the first device 110 and second device 112 as described with reference to FIG. 1). In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof and utilize a GRS link. In at least one embodiment, one or more components of system 600 are interconnected using compute express link ("CXL") interconnects. In an embodiment, the transceiver 626 can include a synchronized rate limiter 115 as described with reference to FIG. 1. In such embodiments, the synchronized rate limiter 115 is configured to be synchronized to a real world time. In some embodiments, the synchronized rate limiter 115 is configured to execute workloads (e.g., transmit packets) at a target real world time after the synchronization as described with reference to FIG. 1-5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a device coupled to a processing device, the processing device to:
receive a timing signal from a global navigation satellite system (GNSS), wherein the timing signal is associated with a synchronized time;
synchronize a rate limiter of the device to the synchronized time responsive to receiving the timing signal;
receive a request to execute one or more workloads, the request comprising a specified rate to execute each workload of the one or more workloads; and
pace, using the rate limiter, execution of the one or more workloads at the rate by adjusting a rate of execution of the one or more workloads based on the specified rate.

2. The system of claim 1, further comprising a second device coupled to the device via a link, the second device to:
receive a second timing signal from the GNSS, wherein the second timing signal is associated with the synchronized time; and
synchronize a second rate limiter of the second device to the synchronized time responsive to receiving the second timing signal.

3. The system of claim 1, further comprising a second device coupled to the device via a link, the device to:
transmit, to the second device, timing information corresponding to the timing signal, wherein the second device is configured to synchronize a second rate limiter of the second device to the synchronized time responsive to receiving the timing information, and wherein the second rate limiter is configured to receive data associated with the one or more workloads at the rate.

4. The system of claim 3, further comprising a third device coupled to the device, wherein the third device is to:
generate the timing signal associated with the synchronized time; and
transmit the timing signal to the device.

5. They system of claim 1, wherein the timing signal is a precision time protocol (PTP) signal or a pulse per second (PPS) signal.

6. The system of claim 1, wherein the processing device is to:
determine the device is not synchronized to the timing signal; and
execute the one or more workloads according to an internal clock of the rate limiter.

7. The system of claim 6, wherein the processing device is to:
receive a second timing signal associated with the synchronized time;
synchronize the rate limiter of the device to the synchronized time responsive to receiving the second timing signal;
determine an error associated with executing the one or more workloads according to the internal clock; and
adjust a rate of executing the one or more workloads in response to determining the error.

8. The system of claim 1, wherein the synchronized time is a real world time or a precision time protocol (PTP) time.

9. A method comprising:
receiving, at a device, a timing signal from a global navigation satellite system (GNSS), wherein the timing signal is associated with a synchronized time;
synchronizing a rate limiter of a transceiver to the synchronized time responsive to receiving the timing signal;
receiving, at the device, a request to execute one or more workloads, the request comprising a specified rate to execute each workload of the one or more workloads; and
pacing, by the rate limiter, execution of the one or more workloads at the rate by adjusting a rate of execution of the one or more workloads based on the specified rate.

10. The method of claim 9, further comprising:
receiving, at a second device, a second timing signal from the GNSS, wherein the second timing signal is associated with the synchronized time; and
synchronizing a second rate limiter of the second device to the synchronized time responsive to receiving the second timing signal.

11. The method of claim 9, further comprising:
transmitting, to the second device, timing information corresponding to the timing signal; and
synchronizing a second rate limiter of the second device to the synchronized time responsive to receiving the timing information, wherein the second rate limiter is configured to receive data associated with the one or more workloads at the rate.

12. The method of claim 11, further comprising:
generating, at a third device, the timing signal associated with the synchronized time; and
transmitting, from the third device to the device, the timing signal.

13. The method of claim 9, wherein the timing signal is a precision time protocol (PTP) signal or a pulse per second (PPS) signal.

14. The method of claim 9, further comprising:
determining the device is not synchronized to the timing signal; and
executing the one or more workloads according to an internal clock of the rate limiter.

15. The method of claim 14, further comprising:
receiving a second timing signal associated with the synchronized time;

synchronizing the rate limiter of the device to the synchronized time responsive to receiving the second timing signal;

determine an error associated with executing the one or more workloads according to the internal clock; and adjust a rate of executing the one or more workloads in response to determining the error.

16. The method of claim 9, wherein the synchronized time is a real world time or a precision time protocol (PTP) time.

17. A system comprising:

a network device coupled to a processing device, the processing device to:

receive a timing signal from a global navigation satellite system (GNSS), wherein the timing signal is associated with a synchronized time;

synchronize a rate limiter of the network device to the synchronized time responsive to receiving the timing signal;

receive a request to transmit the one or more packets, the request comprising a specified rate to transmit each packet of the one or more packets; and pace, by the rate limiter, transmission of the one or more packets at the rate by adjusting a rate of transmission of the one or more packets based on the specified rate.

18. The system of claim 17, wherein the network device is a network interface card, a network device, or a data processing unit.

* * * * *